Patented May 1, 1951

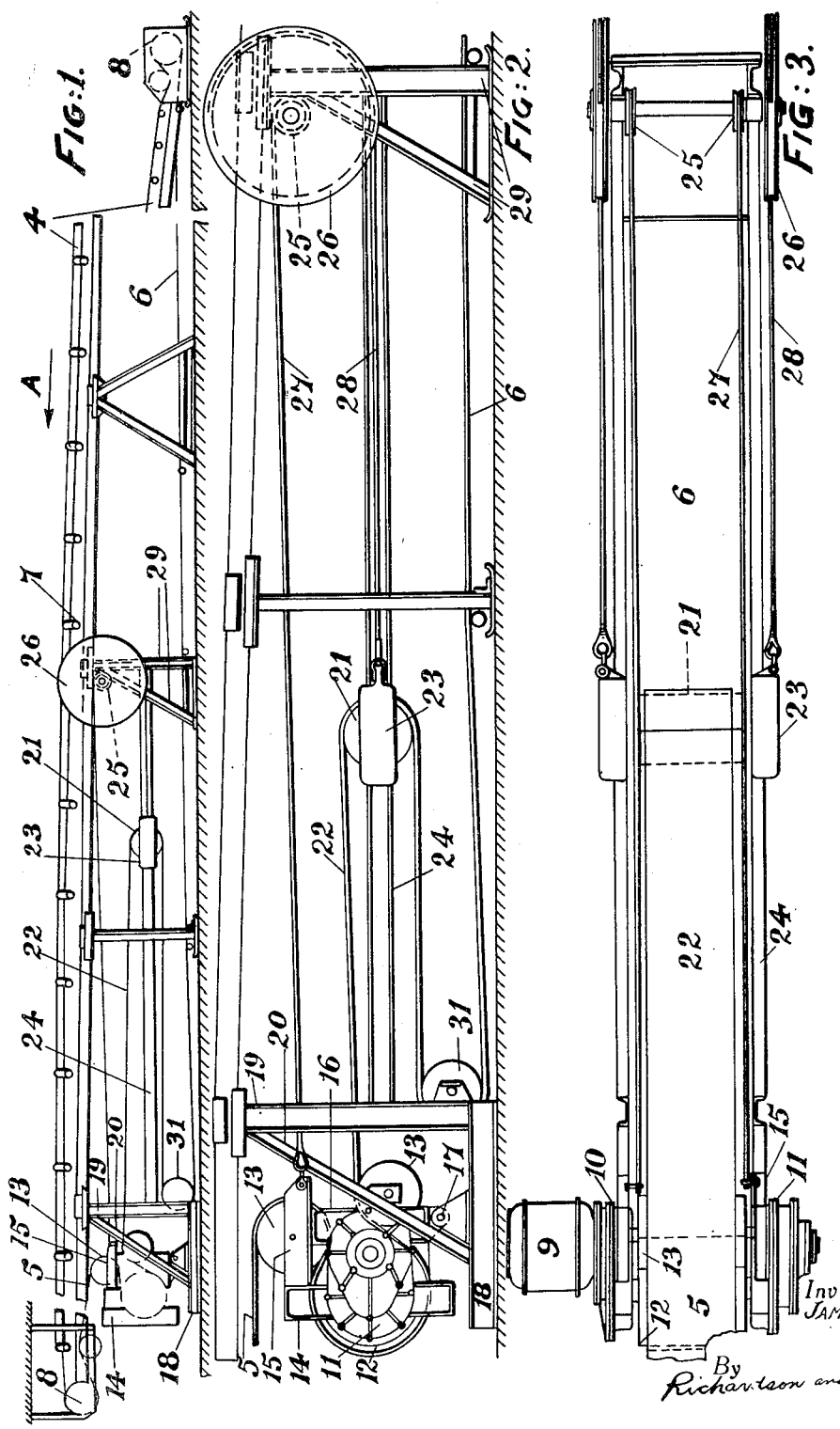

2,551,512

UNITED STATES PATENT OFFICE 2,551,512

CONVEYER OF ENDLESS BELT TYPE

James Thomson, Glasgow, Scotland, assignor to Mavor & Coulson, Limited, Glasgow, Scotland Application October 22, 1947, Serial No. 781,391
In Great Britain October 12, 1945

Section 1, Public Law 690, August 8, 1946
Patent expires October 12, 1965

9 Claims. (Cl. 198—208)

This invention refers to conveyors of endless belt type, in which problems arise in maintaining the tension of the return run in relation to that of the conveying run of the belt under load.

It will be understood that the driving gear of such a conveyor, usually comprising a motor, transmission gearing and one or more driving drums, is of considerable weight, often several tons.

An object of this invention is to utilise the weight of the driving gear to apply a tensioning action to the belt in such a way that a small tensioning movement of the gear produces a substantial stretch in the belt, the arrangement to be such that the magnitude of the tension in the return run is automatically varied in proportion to the load to which the conveying run of the belt is subjected.

Another object is to provide for the driving gear a pivotal support to carry part of the weight of the gear while the remainder of the weight is transmitted through motion-multiplying mechanism to a movable tensioning pulley or drum forming a loop in the belt.

Another object is to add to the constant weight of the driving gear the pull of the belt on a pulley associated with the driving gear and to connect the gear and this pulley through motion-magnifying mechanism to another movable pulley forming a belt-tensioning loop in a stretch of the return run out-going from the gear and serving to maintain the return run appropriately tensioned in relation to the conveying run.

The invention will now be described by way of example with reference to the accompanying drawing, in which:

Fig. 1 is a diagrammatic elevation of portions of an endless belt conveyor embodying the invention. Fig. 2 is an elevation to a larger scale than Fig. 1 of the driving gear and associated parts. Fig. 3 is a plan corresponding to Fig. 2.

Referring to the drawing, the endless conveyor belt is arranged in two runs, namely an upper run 4 and a lower run comprising a tensioned stretch 5 and a so-called "slack" stretch 6, between which two stretches the driving gear operates. In the example shown the upper run 4 is the conveying run and conveys from right to left (in the direction of the arrow A, Fig. 1). The upper run 4 is as usual of trough form in cross-section, being supported by so-called troughing rollers 7. At opposite ends of the conveyor structure the belt passes round end rollers 8. The driving gear us usual comprises an electric motor 9, gearing (not shown) working in casings 10 and 11 (Fig. 3) and a driving drum 12 wrapped by the lower run of the belt. Guide pulleys 13 lead the belt appropriately to and from the drum 12. The driving gear is located at an intermediate portion in the lower run of the belt.

The driving gear components 9, 10, 11 and 12 are arranged on a pivotal frame including main uprights 14 on which are mounted the motor and gear casings, longitudinal arms 15 in which the upper one of the guide pulleys 13 is journalled, and members 16 at one side of the gear casings. The foot of the pivotal frame is pivotally mounted at 17 on a base 18 for movement about a horizontally transverse axis. The base 18 is part of a stationary structure including also uprights 19 and stays 20. In Figs. 1 and 2 only the parts 14, 18, 19 and 20 at one side of the conveyor are shown, but there are similar parts at the opposite side.

Parts provided for the purposes of this invention include a belt drum or pulley 21 which forms a loop 22 in the slack stretch 6 of the lower run. The drum 21 is journalled in a bearing block 23 which is longitudinally slidable on side rails 24 incorporated in the stationary structure of the conveyor. The said parts also include a differential rope-pulley assembly, constituting a motion-multiplying mechanism and consisting of two small diameter pulleys 25 and two large diameter pulleys 26. To these pulleys 25 and 26 are connected the ends of ropes 27 and 28 respectively, the ropes 27 being wound on their pulleys 25 oppositely to the ropes 28 on their pulleys 26. The assembly 25, 26 of pulleys is journalled in framework 29 which is incorporated in the stationary structure of the conveyor. The ropes 27 and 28 are connected at their other ends to the arms 15 and the slidable block 23 respectively. The said parts also include a guide pulley 31 for the lower stretch of the loop 22, said roller being journalled on the upright 19.

As shown, the tensioned stretch 5 of the lower run of the conveyor belt passes to the driving drum 12 by way of one of the guide rollers 13. This in-going stretch 5 is subjected to the tension of the conveying run 4, and so the stretch 5 continuously pulls on the upper pulley 13 with a force which will vary in proportion to the load on the conveyor. The slack stretch, namely the out-going stretch, leaves the drum 12 by way of the lower guide roller 13 and becomes merged in the loop 22, which extends horizontally from left to right, being formed by the longitudinally movable drum 21.

The frame 14, 15 and 16 and the driving-gear components on it together form a single or unitary assembly, and this assembly is pivotally mounted at 17 on the base 18, which supports part of the weight of the driving-gear assembly. The arrangement is such that a substantial portion of the weight is out-of-balance. The unbalanced weight is applied through the ropes 27 to the pulley assembly 25, 26 and thence through the next connections, namely the ropes 28, to the loop-forming drum 21. The pull of all these ropes strives to elongate the loop 22 and therefore to tension the "slack" stretch 6 of the lower run of the conveyor belt. The driving-gear assembly acts as a tensioning mass, being suspended in an unbalanced or floating condition. In the event that the tension of the conveyor tends to decrease due to decrease in load, the stretch 6 of the conveyor belt tends to slacken, and so the driving gear lowers to an extent which ordinarily would be very slight and imparts a short pull to the ropes 27, in consequence of which the differential action of the pulley assembly 25, 26 causes a longer pull to be imparted to the ropes 28, so that the pulley 21 is moved adequately to maintain the tension of the stretch 6 and of the conveyor belt 4, 5 and 6 as a whole.

It will be noted that the requisite belt tension is applied by the tensioning drum 21 to the loop 22 which is formed in the belt by said drum in co-operation with the guide roller 31. This arrangement ensures that the belt, during increase of its tension by the drum 21, is stretched to an extent greater than the movement of the pivotal frame 14, 15, 16 at the point of connection to the ropes 27; and this would be so ever if the drum block 23 were rope-connected dire to the arms 15 of the pivotal frame, instead of being connected as shown through the motion-multiplying mechanism 25, 26. However, the interposition of the mechanism 25, 26 ensures that the stretch imparted by the drum 21 to the belt is many times greater than the movement of the arms 15. Accordingly, any movements of the driving-gear assembly about its axis of pivot are very small, and nevertheless the range of belt-tensioning adjustment is comparatively great.

By virtue of the smallness of the movement of the driving-gear assembly and the formation of the loop 22 lengthwise of the conveyor, the belt-tensioning arrangement does not add to the over-all height of the conveyor, this being an important factor in a conveyor designed for use in places, for instance in coal and other mines, where the head-room is very restricted.

It will also be noted that the pivotal frame 14, 15, 16 is a lever, the fulcrum of which is the pivotal mounting 17. The pull applied through this lever to the ropes 27 is due not only to the practically constant turning moment of the weight of the driving-gear assembly 9, 10, 11, 12, but also to the pull of the stretch 5 of the belt on the upper guide pulley 13 journalled in the arms 15, which pull varies with the driving load. Thus, the belt-tensioning load applied to the ropes 27 is very substantial and therefore is reliable. Nevertheless, despite the heavy load applied to the ropes 27, there is no danger of overloading the loop 22 of the lower run of the belt, because the motion-multiplying mechanism 25, 26 serves also to reduce the pull transmitted through the ropes 28 to the bearing block 23.

The fact that the pivotal frame 14, 15, 16 is a lever offers a convenient medium for predetermining the belt-tensioning load to be applied by the drum 21. That is to say, the leverage of the frame 14, 15, 16 can be increased or decreased by appropriate positioning of (1) the point of connection between the ropes 27 and arms 15; (2) the point where the upper roller 13 is journaled in the arms 15 and (3) the point of pivotal mounting at 17. Provision may be made for adjusting any one or more of these three points.

By virtue of the pull applied by the belt through the looped stretch 5 and the upper pulley 13, the tension applied by the drum 21 to the slack stretch of the return run will vary automatically in proportion to the driving load; in other words, the slack side of the belt will maintain its proper tension relationship with the fully tensioned side. Moreover, when the belt is under "no-load" conditions, the weight of the gear will maintain the entire belt properly tensioned for starting or for "no-load" running.

I claim:

1. A conveyor comprising an endless belt, gear applied to the belt so as to drive the belt and supported so as to be movable under its own weight, a movable pulley also applied to the belt so as to tension the belt, and a differential pulley assembly consisting of a small pulley connected to the belt-driving gear and a large pulley connected to the belt-tensioning pulley so that any movement of said gear is magnified in transmission to said belt-tensioning pulley.

2. A conveyor comprising an endless belt, gear applied to the belt so as to drive the belt and supported so as to be movable under its own weight, a pulley connected with said gear and applied to said belt so as to be movable under the influence of the conveying run thereof added to such weight, a second movable pulley applied to a slack stretch of the return run of the belt so as to form a loop in and tension the belt, motion-multiplying mechanism, a connection from the first-mentioned pulley to said mechanism, and a connection from said mechanism to the second-mentioned pulley, said connections and mechanism transmitting to said second-mentioned pulley a magnified loop-extending movement derived from movement of said first-mentioned pulley.

3. A conveyor comprising an endless belt, driving gear applied to one run of said belt, a bearing movable lengthwise of the conveyor, a belt-tensioning pulley journalled in said bearing and forming a stretch of said run into a loop, a motion-multiplying mechanism, a pivotal support to take part of the weight of the driving gear, a connection to transmit the remainder of the weight of the driving gear to the motion-multiplying mechanism, and a connection between said mechanism and said movable bearing, said connections and mechanism serving to apply to the loop through said pulley a belt-tensioning action due to the load applied by the weight of the driving gear and said motion-multiplying mechanism comprising a differential pulley assembly consisting of small and large diameter pulleys, the former being connected to the driving gear to take part of the weight thereof and the latter being connected to said bearing of the belt-tensioning pulley.

4. A conveyor comprising an endless belt, a pivotal support in the nature of a lever, driving gear carried on said support and applied to the belt to drive it, a belt-guiding pulley which is journalled in said support and which guides the belt to said gear, said pulley being subjected to the tension due to driving the load to which the conveyor is subjected, a movable belt-tensioning pulley applied to the belt to form a loop in an out-going stretch of the return run of the belt, a motion-multiplying and force-reducing mechanism, a connection between said pivotal support and said mechanism, and a connection between said mechanism and said second-mentioned pulley for transmitting to said second-mentioned pulley on the occurrence of any increase in the load a loop-lengthening force, the force applied through the first-mentioned connection to said mechanism being determined by the weight of the driving gear, the increased pull applied by the belt to the belt-guiding pulley and the leverage of said pivotal support.

5. A conveyor comprising an endless belt, one run of which receives the material to be conveyed and another run of which is the return run, gear applied to the belt so as to drive it, said gear being gravitationally movable to apply its weight to the belt, a pulley movable with said gear and applied to a stretch of the belt going into the gear, said stretch applying to said pulley a force adding to the weight of the gear, a movable belt-tensioning pulley forming a loop in an out-going stretch of the return run of the belt, a connection between said two pulleys for moving each in unison with the other, and means incorporated in said connection to cause movement of the belt-tensioning pulley greater than the movement of said other pulley with said gear and thus produce in the return run an automatically varying tensioning effect proportional to the load on the conveying run.

6. A conveyor as claimed by claim 5 in which the movement-causing means comprises a differential pulley assembly consisting of a small diameter pulley, which is connected to the pulley that is movable with the belt-driving gear in order to rotate in unison with linear movements of said pulley, and a large diameter pulley which is connected to the belt-tensioning pulley in order to cause it to move to an extent greater than such movements of said first-mentioned pulley.

7. A conveyor comprising an endless belt, one run of which receives the material to be conveyed and another run of which is the return run, gear applied to the return run so as to drive the belt, a frame carrying said driving gear, a pivotal mounting for said frame about which mounting the frame and gear are movable as a unit to apply the weight of the unit to the return run of the belt, a belt-loaded pulley journaled in said frame and forming a loop in that stretch of the return run which goes into the gear, the loading on said pulley adding to the weight of the unit, a longitudinally movable support, a belt-tensioning pulley journaled on said support and forming a loop in the out-going stretch of the return run, a connection between said frame and said support for moving the support in unison with movements of the unit about the pivotal mounting, and a motion-multiplying mechanism incorporated in said connection to effect a greater movement of the belt-tensioning pulley than of the belt-loaded pulley.

8. A conveyor as claimed by claim 7 in which the motion-multiplying mechanism comprises a differential pulley assembly consisting of a small diameter pulley, which is connected to the frame of the pivotally mounted gear-frame unit in order to rotate in unison with movements of said unit, and a large diameter pulley which is connected to the support on which the belt-tensioning pulley is journaled in order to cause the belt-tensioning pulley to move longitudinally to an extent greater than such movements of said belt-loaded pulley.

9. A conveyor comprising an endless belt, a movable unit including belt-driving gear applied to the belt and a belt-loaded pulley movable as a component of the unit and under the influence of the tension of the conveying run of the belt, a pivotal mounting to which said unit is connected and about which said unit is movable, said mounting being in a low location relative to said gear, a movable tensioning pulley forming a loop in a slack stretch of the return run of the belt, and a connection between said two pulleys including means whereby any movement of said belt-loaded pulley with said gear about said mounting caused by increase or decrease of tension added to the weight of said unit is automatically accompanied by a greater loop-lengthening or loop-shortening movement of said tensioning pulley.

JAMES THOMSON.

REFERENCES CITED

The following references are of record in the file of this patent:

UNITED STATES PATENTS

| Number | Name | Date |
|---|---|---|
| 1,540,720 | Buckbee | June 2, 1925 |
| 2,202,882 | Wylie | June 4, 1940 |